United States Patent
Yu et al.

(10) Patent No.: US 11,121,404 B2
(45) Date of Patent: Sep. 14, 2021

(54) GEL POLYMER ELECTROLYTE AND LITHIUM SECONDARY BATTERY COMPRISING THE SAME

(71) Applicant: LG Chem, Ltd., Seoul (KR)

(72) Inventors: Sung Hoon Yu, Daejeon (KR); Kyung Mi Lee, Daejeon (KR); Yoo Sun Kang, Daejeon (KR); Jung Hoon Lee, Daejeon (KR); Doo Kyung Yang, Daejeon (KR)

(73) Assignee: LG Chem, Ltd.

( * ) Notice: Subject to any disclaimer, the term of this patent is extended or adjusted under 35 U.S.C. 154(b) by 220 days.

(21) Appl. No.: 14/413,755

(22) PCT Filed: Oct. 28, 2014

(86) PCT No.: PCT/KR2014/010170
§ 371 (c)(1),
(2) Date: Jan. 9, 2015

(87) PCT Pub. No.: WO2015/065004
PCT Pub. Date: May 7, 2015

(65) Prior Publication Data
US 2016/0028110 A1 Jan. 28, 2016

(30) Foreign Application Priority Data
Oct. 29, 2013 (KR) .................. 10-2013-0129439

(51) Int. Cl.
*H01M 10/0565* (2010.01)
*H01M 10/052* (2010.01)
(Continued)

(52) U.S. Cl.
CPC ....... *H01M 10/0565* (2013.01); *H01M 4/667* (2013.01); *H01M 10/052* (2013.01);
(Continued)

(58) Field of Classification Search
CPC .... H01M 2/32; H01M 4/667; H01M 2220/30; H01M 10/0565; H01M 10/052;
(Continued)

(56) References Cited

U.S. PATENT DOCUMENTS 3,546,649 A * 12/1970 Hermann ................ B29C 63/00
29/605
6,013,393 A 1/2000 Taniuchi et al.
(Continued)

FOREIGN PATENT DOCUMENTS

CN 1423358 A 6/2003
CN 1645662 A 7/2005
(Continued)

OTHER PUBLICATIONS

Truc et al. Corrosion Science vol. 44 2002 pp. 2055-2071.*
(Continued)

*Primary Examiner* — Cynthia H Kelly
*Assistant Examiner* — Aaron J Greso
(74) *Attorney, Agent, or Firm* — Lerner, David, Littenberg, Krumholz & Mentlik, LLP

(57) ABSTRACT

The present disclosure relates to a gel polymer electrolyte including an imide salt, and a lithium secondary battery including the same and having a protective film formed on a cathode tab. Disclosed are a gel polymer electrolyte that allows the production of a secondary battery having excellent quality with no corrosion of a cathode, while using, as an electrolyte, an imide-based salt effective for improvement of output quality and high-temperature storability, as well as a secondary battery including the same.

12 Claims, 4 Drawing Sheets

(51) Int. Cl.
*H01M 4/66* (2006.01)
*H01M 50/571* (2021.01)
*H01M 10/0567* (2010.01)

(52) U.S. Cl.
CPC ...... *H01M 50/571* (2021.01); *H01M 10/0567* (2013.01); *H01M 2220/30* (2013.01); *H01M 2300/0082* (2013.01); *H01M 2300/0085* (2013.01)

(58) Field of Classification Search
CPC ..... H01M 10/0567; H01M 2300/0082; H01M 2300/0085; Y02E 60/122
See application file for complete search history.

(56) References Cited

U.S. PATENT DOCUMENTS

| | | | | |
|---|---|---|---|---|
| 6,203,942 | B1 * | 3/2001 | Gan | H01M 10/0567 429/203 |
| 6,379,846 | B1 * | 4/2002 | Terahara | H01M 6/168 252/62.2 |
| 6,682,855 | B2 * | 1/2004 | Michot | C01B 21/0935 429/231.95 |
| 7,709,157 | B2 | 5/2010 | Mie et al. | |
| 8,137,849 | B2 | 3/2012 | Kang et al. | |
| 2002/0110739 | A1 | 8/2002 | McEwen et al. | |
| 2003/0099880 | A1 | 5/2003 | Park et al. | |
| 2004/0106047 | A1 * | 6/2004 | Mie | H01M 6/166 429/324 |
| 2007/0111105 | A1 * | 5/2007 | Zaghib | H01M 6/168 429/322 |
| 2008/0090145 | A1 | 4/2008 | Hiwara et al. | |
| 2009/0169992 | A1 * | 7/2009 | Ishiko | H01M 6/166 429/188 |
| 2010/0003604 | A1 * | 1/2010 | Kang | C07F 9/091 429/314 |
| 2010/0086858 | A1 * | 4/2010 | Kim | H01M 2/16 429/246 |
| 2010/0297505 | A1 | 11/2010 | Oki et al. | |
| 2011/0008680 | A1 | 1/2011 | Muldoon et al. | |
| 2011/0070504 | A1 * | 3/2011 | Matsumoto | H01M 10/0525 429/325 |
| 2012/0121974 | A1 | 5/2012 | Tikhonov et al. | |
| 2012/0316716 | A1 * | 12/2012 | Odani | H01M 10/0567 701/22 |
| 2014/0255778 | A1 * | 9/2014 | Huh | H01M 2/26 429/211 |

FOREIGN PATENT DOCUMENTS

| | | | | |
|---|---|---|---|---|
| CN | 101103070 | A | 1/2008 | |
| CN | 101436653 | * | 5/2009 | H01M 2/30 |
| CN | 101702449 | A | 5/2010 | |
| CN | 201503887 | * | 6/2010 | H01M 10/0525 |
| CN | 103165938 | * | 6/2013 | H01M 10/0565 |
| EP | 0823744 | A2 | 2/1998 | |
| EP | 2615680 | A1 | 7/2013 | |
| JP | H103945 | A | 1/1998 | |
| JP | 2000-294284 | * | 10/2000 | H01M 10/052 |
| JP | 2001093574 | A | 4/2001 | |
| JP | 2003168417 | A | 6/2003 | |
| JP | 2004047487 | A | 2/2004 | |
| JP | 2005-183249 | * | 7/2005 | C08K 3/32 |
| JP | 2005-183249 | A | 7/2005 | |
| JP | 2005-524713 | * | 7/2005 | C08K 3/32 |
| JP | 2007-103214 | * | 4/2007 | |
| JP | 2009070606 | A | 4/2009 | |
| JP | 2009-277413 | A | 11/2009 | |
| JP | 2009544794 | A | 12/2009 | |
| JP | 2011001254 | A | 1/2011 | |
| JP | 2013016456 | A | 1/2013 | |
| JP | 2013152825 | A | 8/2013 | |
| KR | 20030042578 | A | 6/2003 | |
| KR | 100744835 | B1 | 7/2007 | |
| KR | 2013-0042578 | A | 4/2013 | |
| KR | 2013-0095796 | A | 8/2013 | |
| WO | 2006075392 | A1 | 7/2006 | |

OTHER PUBLICATIONS

Efremov et al. (SciFinder Abstract available only: Vysokochistye Veshchestva No. 6 pp. 68-87)—Russian document on order.*
Mark Shwartz Stanford News Service Release date May 11, 2000 Wayback web date Jul. 27, 2010.*
CN 201503887 ESPACENET English Machine Translation—printed Sep. 8, 2019.*
CN 201503887 ESPACENET Abatract—printed Sep. 8, 2019.*
JP 2007103214 Espacenet English mahcine translation printed Jan. 7, 2020.*
JP 2007103214 JPO Abstract printed Jan. 7, 2020.*
Search Report from European Application No. 14825079.8, dated Aug. 22, 2016.
Office Action from Chinese Application No. 201480002099.7, dated Aug. 3, 2016.
International Search Report from PCT/KR2014/010170, dated Jan. 27, 2015.
Chinese Search Report for Application No. 201480002099.7 dated Apr. 19, 2017.
Kisung Park, Corrosion inhibition of aluminum in lithium imide electrolyte by lithium borate addition, Department of Energy System Engineering, DGIST, pp. 1-46, Nov. 15, 2013.

* cited by examiner

[Fig. 1A]
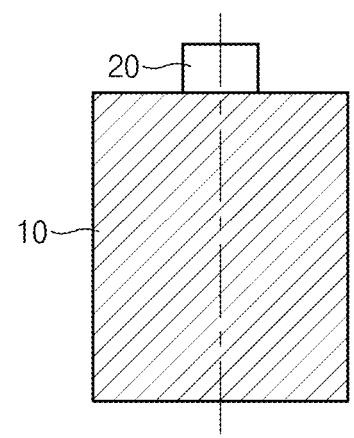
[Fig. 1B]
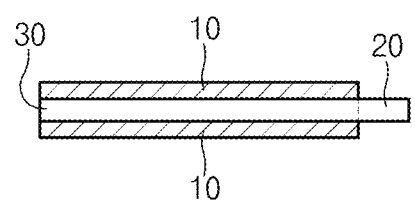

[Fig. 2A]
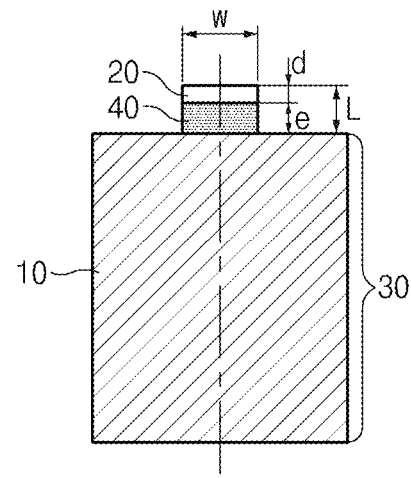
[Fig. 2B]
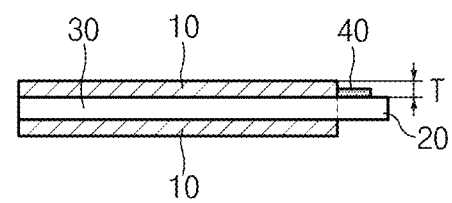
[Fig. 3]
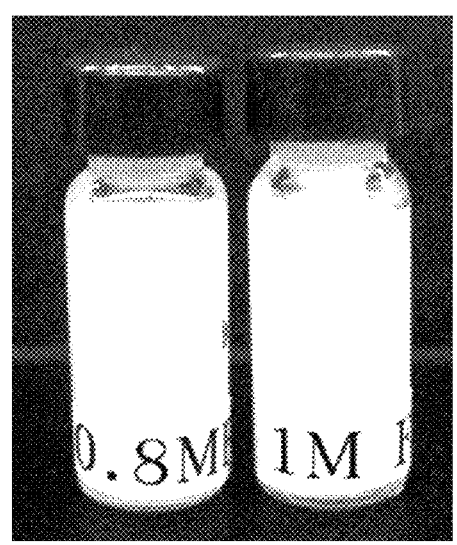

[Fig. 4]
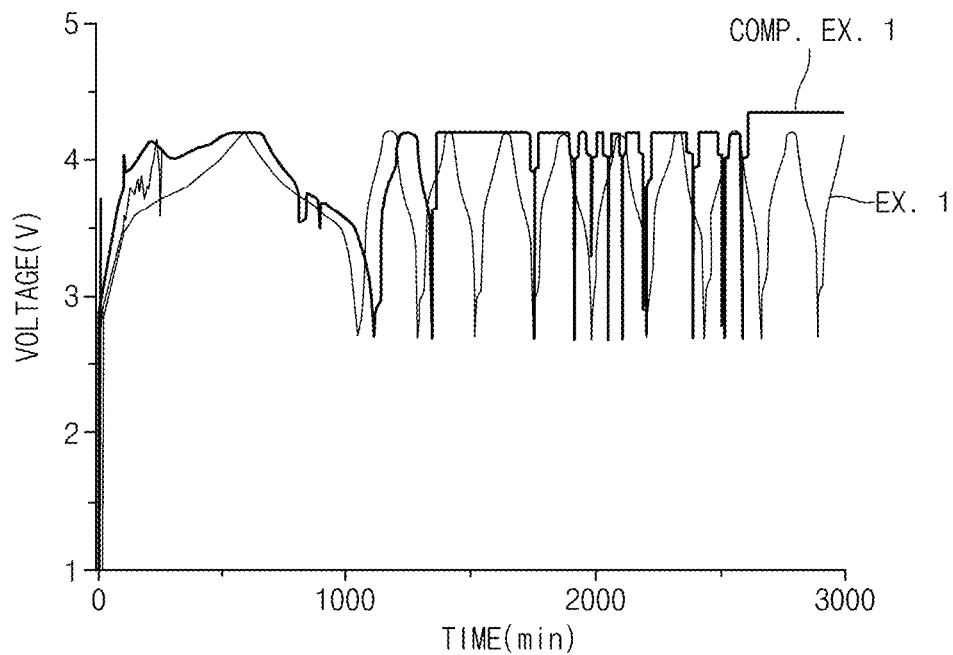
[Fig. 5]
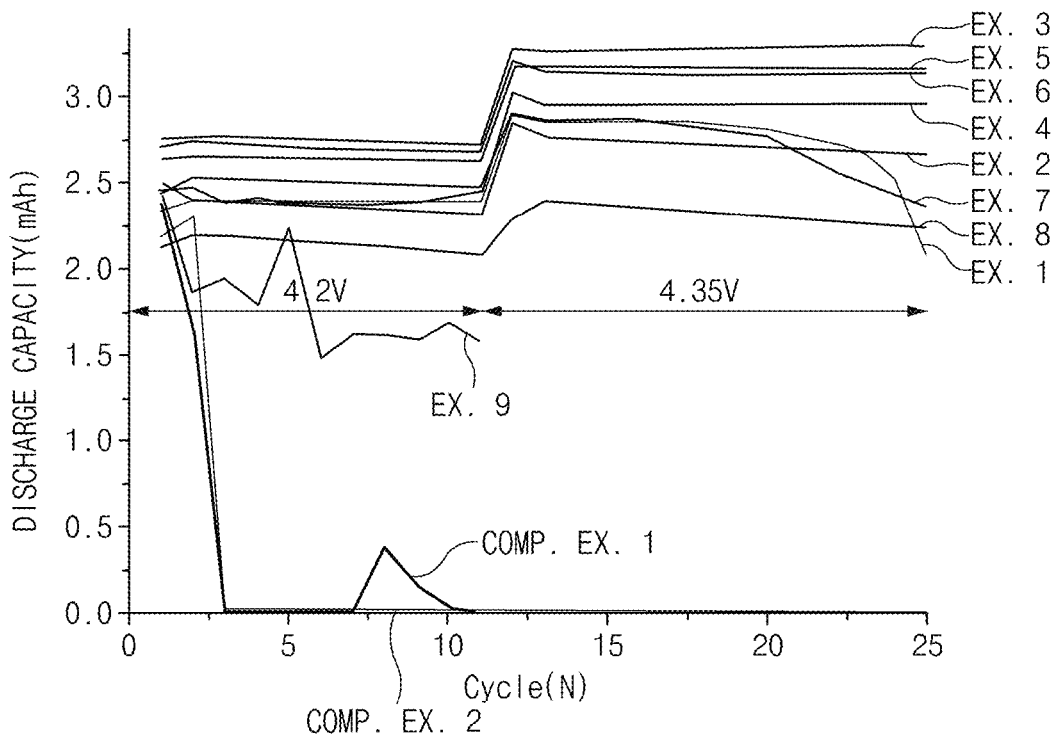

[Fig. 6]
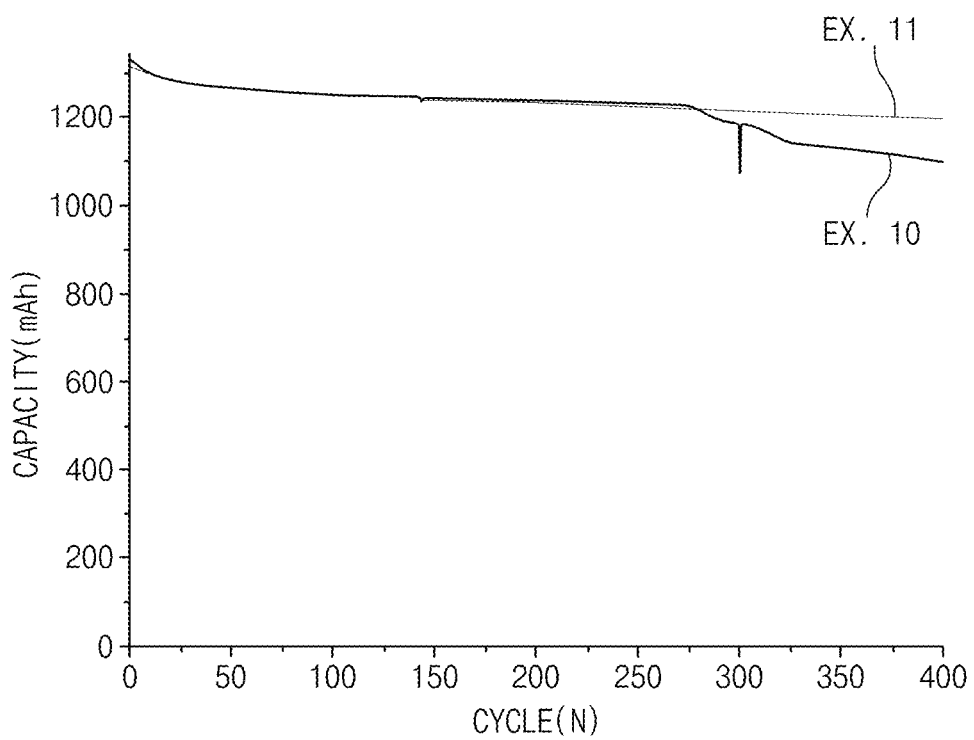
[Fig. 7]
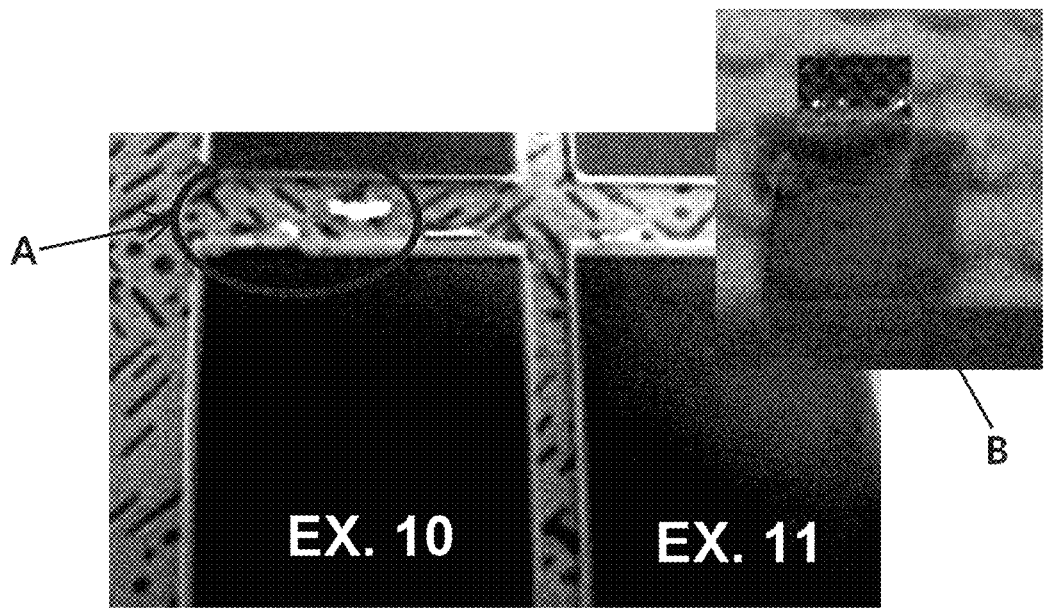

GEL POLYMER ELECTROLYTE AND LITHIUM SECONDARY BATTERY COMPRISING THE SAME

CROSS-REFERENCE TO RELATED APPLICATION

This application is a national phase entry under 35 U.S.C. § 371 of International Application No. PCT/KR2014/010170, filed Oct. 28, 2014, which claims priority to Korean Patent Application No. 10-2013-0129439, filed on Oct. 29, 2013, the disclosures of which are incorporated herein by reference.

TECHNICAL FIELD

The present disclosure relates to a gel polymer electrolyte and a lithium secondary battery including the same. More particularly, the present disclosure relates to a gel polymer electrolyte including an imide salt, and a lithium secondary battery including the same and having a protective film formed on a cathode tab.

BACKGROUND ART

In general, a secondary battery means a battery capable of charging/discharging, unlike a non-rechargeable primary battery, and is used widely in the field of advanced electronic instruments such as cellular phones, notebook computers and camcorders.

Such a lithium secondary battery uses a lithium-based oxide as a cathode active material and a carbonaceous material as an anode active material. In addition, a non-aqueous electrolyte is used as an electrolyte because of the reactivity between lithium and water. Lithium secondary batteries may be classified into lithium ion batteries using a liquid electrolyte and lithium polymer batteries using a polymer electrolyte, depending on the type of electrolyte. The polymer electrolyte may include an all-solid type polymer electrolyte containing no organic electrolyte solution and a gel type polymer electrolyte containing an organic electrolyte solution.

With regard to an electrolyte solution for lithium secondary batteries, when using an imide-based salt as an electrolyte salt, an electrolyte containing an imide-based salt having low viscosity shows a small increase in viscosity of organic solvent at low temperature, thereby maintaining lithium ion mobility, resulting in significant improvement of high-temperature storability and low-temperature output characteristics. However, as compared to $LiPF_6$ used currently as an electrolyte salt, an imide-based salt may corrode aluminum (Al) as a cathode collector, and thus is limited in application to secondary batteries.

When using an imide salt for an electrolyte solution, there are several opinions about the causes of degradation of inhibition against corrosion of metal, i.e., aluminum as a cathode collector.

For example, according to an opinion, imide anion directly causes corrosion of aluminum. However, according to another opinion, aluminum itself is highly corrosive material and the use of an imide salt does not form a coating film capable of inhibiting corrosion of aluminum to fail in inhibition against corrosion of aluminum, while the use of $LiPF_6$ forms such a coating film.

In other words, the cause of degradation of inhibition against corrosion of aluminum as a cathode collector when using an imide salt as an electrolyte salt has not been shown clearly to date. However, there is a need for a method for preventing corrosion of a cathode collector such as aluminum, while using an imide-based salt effective for improvement of output characteristics and high-temperature storability.

The present inventors have found that when using an imide salt for a gel polymer electrolyte, corrosion of an aluminum collector is reduced significantly, and thus it is possible to provide a secondary battery having excellent stability and quality. The present disclosure is based on this finding.

DISCLOSURE

Technical Problem

A technical problem to be solved by the present disclosure is to provide an electrolyte that allows the production of a secondary battery having excellent quality with no corrosion of a cathode, while using, as an electrolyte salt, an imide-based salt effective for improvement of output quality and high-temperature storability, as well as a secondary battery including the same.

Technical Solution

In one general aspect, there is provided a gel polymer electrolyte obtained by polymerizing a composition for a gel polymer electrolyte including a polymerizable monomer, a polymerization initiator, an electrolyte salt and an electrolyte solvent, wherein the electrolyte salt is an imide salt.

In another general aspect, there is provided a secondary battery including the gel polymer electrolyte.

Advantageous Effects

According to the embodiments of the present disclosure, it is possible to provide an electrolyte that allows the production of a secondary battery having excellent quality with no corrosion of a cathode, while using, as an electrolyte salt, an imide-based salt effective for improvement of output quality and high-temperature storability, as well as a secondary battery including the same.

DESCRIPTION OF DRAWINGS

FIG. 1A shows a plane view of a cathode having a cathode tab that protrudes from a cathode collector, and FIG. 1B shows a lateral sectional view of FIG. 1A.

FIG. 2A shows a plane view of a cathode including a protective film on a cathode tab which is a non-coated portion, and FIG. 2B shows a lateral sectional view of FIG. 2A, according to an embodiment.

FIG. 3 is a photo illustrating a composition for a gel polymer electrolyte obtained according to the present disclosure, after gelling.

FIG. 4 and FIG. 5 are graphs showing the results of Test Example 1 and Test Example 2.

FIG. 6 is a graph showing the results of Test Example 3.

FIG. 7 is a photo illustrating the polymer cells obtained according to Example 10 and Example 11, after carrying out the test of Test Example 3.

DETAILED DESCRIPTION OF MAIN ELEMENTS

10: cathode active material-coated portion
20: cathode tab

30: cathode collector
40: protective film
l: length of protective film
w: width of protective film
T: thickness of protective film
A: cathode tab portion of polymer cell according to Example 10
B: enlarged view of cathode tab to which protective film is attached in polymer cell according to Example 11

BEST MODE

In one aspect, the present disclosure provides a gel polymer electrolyte obtained by polymerizing a composition for a gel polymer electrolyte including a polymerizable monomer, a polymerization initiator, an electrolyte salt and an electrolyte solvent, wherein the electrolyte salt is an imide salt.

Preferably, the imide salt is a compound represented by the following Chemical Formula 1:

  [Chemical Formula 1]

wherein each of $R_1$ and $R_2$ independently represents fluorine (F) or a perfluoroalkyl.

The compound represented by Chemical Formula 1 may include lithium bis(fluorosulfonyl)imide (LiFSI), lithium bis(trifluoromethanesulfonyl)imide (LiTFSI) or lithium bis(perfluoroethanesulfonyl)imide (LiBETI). Preferably, the compound represented by Chemical Formula 1 is bis(fluorosulfonyl)imide (LiFSI).

As an electrolyte salt for use in the electrolyte according to the present disclosure, the composition for a gel polymer electrolyte may further include a lithium salt other than the imide salt represented by Chemical Formula 1. The electrolyte salt may be used in a concentration of 0.5M-2.0M based on the composition for a gel polymer electrolyte.

In the gel polymer electrolyte according to the present disclosure, the molar ratio of the lithium salt other than the imide salt:imide salt may be 1:10 to 8:2, preferably 2:8 to 7:3.

Meanwhile, the polymerizable monomer preferably includes an acrylate compound, but is not limited thereto.

Particularly, the polymerizable monomer may be a compound such as 2-cyanoethyl acrylate, tetraethyleneglycol diacrylate, polyethyleneglycol diacrylate, 1,4-butanediol diacrylate, 1,6-hexanediol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, polyethyleneglycol diglycidyl ether, 1,5-hexadiene diepoxide, glycerol propoxylate triglycidyl ether, vinylcyclohexene dioxide, 1,2,7,8-diepoxyoctane, 4-vinylcyclohexene dioxide, butylglycidyl ether, diglycidyl 1,2-cyclohexanedicarboxylate, ethyleneglycol diglycidyl ether, glycerol triglycidyl ether or glycidyl methacrylate. These monomers may be used alone or in combination upon polymerization.

In addition, the polymerizable monomer may further include a monomer containing a functional group, such as phosphate or sulfate group, capable of inhibiting corrosion to carry out polymerization.

The monomer containing a functional group capable of inhibiting corrosion may be at least one compound selected from the group consisting of ethyleneglycol methacrylate phosphate, Mevinphos, 2-methacryloyloxyethyl phosphorylcholine, bis[2-(methacryloyloxy)ethyl]phosphate, Crotoxyphos, methyl (2E)-3[(dimethoxyphosphoryl)oxy]but-2-enoate, monoacryloxyethyl phosphate, 10-(phosphonoxy)decyl methacryate, 2-((diethoxyphosphinyl)oxy)ethyl methacryate, (phosphonoxy)propane-1,3-diyl bismethacrylate, 2-sulfoethyl methacrylate, [2-(methacryloyloxy)ethyl] dimethyl-(3-sulfopropyl)ammonium hydroxide, 2-propenoic acid, 4-[(methylsulfonyl)oxy]butyl ester, 2-(methanesulfonyloxy)ethyl methacrylate and 2-(methanesulfonyloxy)ethyl acrylate, but is not limited thereto.

In addition, the composition for a gel polymer electrolyte may further include a corrosion inhibitor as an additive.

The corrosion inhibitor may be selected from the group consisting of the compounds represented by the following Chemical Formula 2 to Chemical Formula 6. The following compounds may be used alone or in combination.

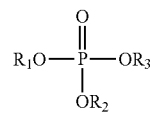  [Chemical Formula 2]

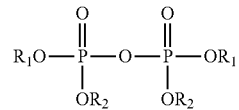  [Chemical Formula 3]

(In Chemical Formula 2 and Chemical Formula 3, each of $R_1$, $R_2$ and $R_3$ independently represents H, a C1-C10 linear or branched alkyl group, a C1-C10 linear or branched alkyl ester group, Na or $Si(CH_3)_3$.)

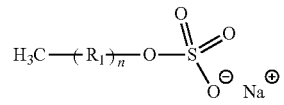  [Chemical Formula 4]

(In Chemical Formula 4, $R_1$ is a $C_1$-$C_6$ linear or branched alkylene group, a $C_6$-$C_{12}$ arylene group or a $C_2$-$C_6$ alkenylene group, and n is an integer of 1-10.)

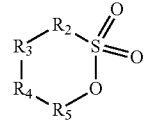  [Chemical Formula 5]

(In Chemical Formula 5, each of $R_2$-$R_5$ independently represents a $C_1$-$C_6$ linear or branched alkylene group, O or $-SO_2-$ group.)

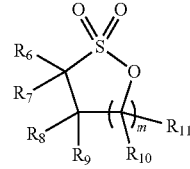  [Chemical Formula 6]

(In Chemical Formula 6, each of $R_6$-$R_{11}$ independently represents a $C_1$-$C_6$ linear or branched alkylene group, a $C_6$-$C_{12}$ arylene group or a $C_2$-$C_6$ alkenyl group, and m is an integer of 0-3.)

More particularly, the compound that may be used as a corrosion inhibitor may include, but is not limited to: tris(trimethylsilyl)phosphate, tris(triethylsilyl)phosphate, $NaH_2PO_4$ (sodium phosphate monobasic), $Na_2HPO_4$, $Na_3PO_4$, $NaHSO_3$, $Na_2SO_3$, methylene methanedisulfonate, propane sultone, propene sultone, ethylene sulfate or ethylene sulfite.

It can be said that the composition for a gel polymer electrolyte according to the present disclosure is an electrolyte precursor solution that is injected into a battery subsequently and subjected to polymerization (gelling) so that it is converted into a gel polymer electrolyte.

In another aspect, the present disclosure provides a secondary battery including a cathode, an anode and the above-described gel polymer electrolyte.

Preferably, the cathode includes: a cathode collector; a cathode tab that protrudes from the cathode collector; and a protective film formed on the cathode tab.

The protective film may include any one or a combination of two or more selected from the group consisting of a polyethylene terephthalate (PET) film, polyimide (PI) film and a polypropylene (PP) film. The protective film may have a thickness of 1 μm to 100 μm.

Preferably, the cathode tab is a non-coated portion having no cathode active material-coated portion.

In addition, the protective film is present preferably in a ratio of 10%-90% based on the total length of the cathode tab along the protruding direction of cathode tab with the same width as the width of the cathode tab perpendicular to the protruding direction of cathode tab.

In the case of a battery using a gel polymer electrolyte as in the present disclosure, the gel polymer electrolyte has little flowability as compared to a liquid electrolyte solution. Thus, it is possible to maximize the effect of taping a protective film.

Hereinafter, the present disclosure will be explained in detail with reference to the accompanying drawings illustrating an exemplary embodiment wherein the gel polymer electrolyte disclosed herein is used and the protective film capable of interrupting a physical contact with the gel polymer electrolyte is provided on at least one surface of the cathode tab.

FIG. 1A shows a plane view of a cathode having a cathode tab that protrudes from a cathode collector, and FIG. 1B shows a lateral sectional view of FIG. 1A.

Particularly, as shown in FIG. 1A and FIG. 1B, a cathode active material-coated portion 10 is present on either surface or both surfaces of a cathode collector 30. In addition, one end to the cathode collector 30 may be formed as a cathode tab 20 in the form of a non-coated portion having no cathode-active material-coated portion.

According to an embodiment of the present disclosure, the cathode tab may be formed by notching a continuous cathode sheet having an active material coated on either surface or both surfaces of the cathode collector at intervals of a unit electrode by using molds.

According to the present disclosure, the cathode tab formed after such notching may be formed as a non-coated portion having no cathode active material-coated portion, as shown in FIG. 1A and FIG. 1B.

Meanwhile, the protective film provided on at least one surface of the cathode tab according to an embodiment of the present disclosure may be varied according to various factors, such as the structure of a secondary battery, but is not limited thereto. A particular embodiment of the protective film will be explained with reference to FIG. 2 A and FIG. 2B.

FIG. 2A shows a plane view of a cathode including a protective film on a cathode tab formed as a non-coated portion, and FIG. 2B shows a lateral sectional view of FIG. 2A, according to an embodiment.

Referring to FIG. 2A and FIG. 2B, a cathode active material-coated portion 10 is formed on either surface of both surfaces of a cathode collector 30, and one end to the collector 30 is provided as a cathode tab 20 in the form of a non-coated portion having no cathode active material-coated portion. In addition, the cathode tab 20 has a protective film 40 on either surface or both surfaces thereof.

According to an embodiment of the present disclosure, as shown in FIG. 2A, the protective film 40 is attached in such a manner that it covers the cathode tab 20, and is present in a ratio of 10%-90%, preferably 20%-70%, based on the total length (d+l) of the cathode tab along the protruding direction L of the cathode tab 20 for the purpose of connection with an external circuit. For example, the protective film may have a length l of 1 mm-10 mm but the length may be varied according to the shape or size of a cathode and those of a secondary battery. It is preferred that the width w of the protective film 40 perpendicular to the protruding direction L of the cathode tab 20 is the same as the width of the cathode tab 20, but is not limited thereto.

Meanwhile, the protective film 40 formed on at least one surface of the cathode tab 20 may have a thickness T of 1 μm-100 μm. When the thickness T of the protective film is excessively small, it is not possible to provide a sufficient effect of protecting the cathode tab from a gel polymer electrolyte. On the other hand, when the thickness is excessively large, the total thickness increases undesirably.

According to an embodiment of the present disclosure, attaching the protective film onto the cathode tab may be carried out in any step of the process for producing a secondary battery with no particular limitation.

For example, according to an embodiment of the present disclosure, a continuous cathode sheet having a cathode active material coated on either surface or both surfaces of a cathode collector is subjected to notching at intervals of a unit electrode in the form of a desired cathode by using molds to form a cathode tab, and a protective film is attached onto the cathode tab. In this manner, it is possible to obtain a cathode tab having a protective film.

According to another embodiment, a cathode active material is applied onto either surface or both surfaces of a cathode collector, and a protective film is attached to the non-coated portion of the cathode collector, followed by notching with molds into the form of a desired cathode tab. In this manner, it is possible to obtain a cathode tab having a protective film.

Meanwhile, the cathode may further include an insulating layer and the insulating layer may be present between the cathode tab and the protective film or on the protective film.

The insulating layer may include at least one selected from the group consisting of polyethylene terephthalate, polypropylene, polyester, polyphenylene sulfide, polyimide, acetate, glass fabric, polyvinylidene fluoride, polyvinylidene fluoride-co-hexafluoropropylene, epoxy resins and polyamide resins.

Meanwhile, according to an embodiment of the present disclosure, the cathode collector is preferably aluminum and the cathode active material used herein may be any one selected from lithium-containing transition metal oxides or equivalents thereof. Particularly, the cathode active material may include a manganese-based spinel active material, lithium metal oxide or a mixture thereof. Further, the lithium metal oxide may be selected from the group consisting of lithium-manganese oxides, lithium-nickel-manganese oxide, lithium-manganese-cobalt oxides and lithium-nickel-manganese-cobalt oxides. More particularly, the lithium metal oxide may be $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (wherein $0\le Y<1$), $Li(Ni_aCo_bMn_c)O_4$ ($0<a<2$, $0<b<2$, $0<c<2$, $a+b+c=2$), $LiMn_{2-z}Ni_zO_4$, or $LiMn_{2-z}Co_zO_4$ (wherein $0<Z<2$).

According to an embodiment of the present disclosure, the anode collector is preferably copper. As an anode active material, a carbonaceous anode material such as crystalline carbon, amorphous carbon or carbon composite may be used alone or in combination, but is not limited thereto.

Each of the cathode collector and anode collector may have a thickness of about 10 μm-100 μm and each electrode active material coated on the collector may have a thickness of about 50 μm-200 μm. However, the present disclosure is not limited thereto.

According to an embodiment of the present disclosure, the anode may be produced with a larger size as compared to the cathode in order to prevent a physical short between both electrodes.

In addition, a separator may be inserted between the cathode and anode in order to prevent a physical short between both electrodes. The separator may include a porous polymer film, such as a single film or laminate of two or more of porous polymer films including a polyolefin-based polymer, such as ethylene homopolymer, propylene homopolymer, ethylene/butene copolymer, ethylene/hexene copolymer and ethylene/methacrylate copolymer. In addition to the above, the separator may include conventional porous non-woven fabrics, such as those formed of high-melting point glass fibers or polyethylene terephthalate fibers, but is not limited thereto.

The appearance of a battery container in which the secondary battery according to the present disclosure is received is not limited particularly, but particular examples of the appearance may include a cylindrical shape, prismatic shape or pouch-like shape.

MODE FOR INVENTION

The examples and experiments will now be described. The following examples and experiments are for illustrative purposes only and not intended to limit the scope of this disclosure.

Example 1

Preparation of Composition for Gel Polymer Electrolyte

First, lithium bis(fluorosulfonyl)imide (LiFSI) is dissolved into a non-aqueous electrolyte solvent containing ethylene carbonate (EC) and ethyl methyl carbonate (EMC) in a volume ratio of EC:EMC=1:2 to a concentration of 1M to provide an electrolyte solution. To 100 parts by weight of the electrolyte solution, 5 parts by weight of mixed polymerizable monomers (2.5 wt % of 2-cyanoethyl acrylate and ditrimethylolpropane tetraacrylate) and 0.25 parts by weight of tert-butylperoxy-2-ethylhexanoate as a polymerization initiator are added to obtain a composition for a gel polymer electrolyte.

<Production of Coin Type Secondary Battery>
Production of Cathode

First, 94 wt % of $Li[Li_{0.29}Ni_{0.14}CO_{0.11}Mn_{0.46}]O_2$ as a cathode active material, 3 wt % of carbon black as a conductive agent and 3 wt % of PVdF as a binder are added to N-methyl-2-pyrrolidone (NMP) as a solvent to provide a cathode mixture slurry. The cathode mixture slurry is applied onto aluminum (Al) foil having a thickness of about 20 μm as a cathode collector, followed by drying, to obtain a cathode. Then, roll pressing is carried out to finish the production of a cathode.

Production of Anode

Carbon-coated SiO and graphite are mixed with a weight ratio of 10:90 to provide an anode active material. Then, the anode active material, carbon black as a conductive agent, SBR and CMC are mixed with a weight ratio of 94:2:2:2. The materials are introduced into distilled water as a solvent, followed by mixing, to obtain homogeneous anode slurry.

The anode slurry is applied onto copper (Cu) foil having a thickness of 10 μm as an anode collector, followed by drying, rolling and punching, to obtain an anode.

Production of Battery

The cathode, anode and a separator having three layers of polypropylene/polyethylene/polypropylene (PP/PE/PP) are used to assemble a battery. Then, the composition for a gel polymer electrolyte prepared as described above is injected to the battery thus assembled, followed by heating at 80° C. under nitrogen atmosphere for 2-30 minutes, thereby providing a coin type secondary battery.

When the composition for a gel polymer electrolyte is injected to a battery and then heated, it is polymerized (gelled) so that it forms a gel polymer electrolyte in the battery. FIG. 3 is a photo illustrating a composition for a gel polymer electrolyte obtained according to the present disclosure, after gelling.

Example 2

A composition for a gel polymer electrolyte is obtained in the same manner as described in Example 1, except that lithium bis(fluorosulfonyl)imide (LiFSI) is used at a concentration of 1.2M instead of 1M. Then, a coin type secondary battery is obtained by using the composition for a gel polymer electrolyte.

Example 3

A composition for a gel polymer electrolyte is obtained in the same manner as described in Example 1, except that a mixture of 0.5M of lithium bis(fluorosulfonyl)imide (LiFSI) with 0.5M of $LiPF_6$ is used instead of 1M of LiFSI. Then, a coin type secondary battery is obtained by using the gel polymer electrolyte.

Example 4

A gel polymer electrolyte is obtained in the same manner as described in Example 3, except that 0.5M of $LiBF_4$ is used instead of 0.5M of $LiPF_6$. Then, a coin type secondary battery is obtained by using the gel polymer electrolyte.

Example 5

A gel polymer electrolyte is obtained in the same manner as described in Example 1, except that 0.5 parts by weight of tris(trimethylsilyl)phosphate is further added as a corrosion inhibitor. Then, a coin type secondary battery is obtained by using the gel polymer electrolyte.

Example 6

A gel polymer electrolyte is obtained in the same manner as described in Example 1, except that 0.5 parts by weight of sodium phosphate monobasic is further added as a corrosion inhibitor. Then, a coin type secondary battery is obtained by using the gel polymer electrolyte.

Example 7

A gel polymer electrolyte is obtained in the same manner as described in Example 1, except that propylene oxide is used as a polymerizable monomer instead of the mixed polymerizable monomers containing 2.5 wt % of 2-cyanoethyl acrylate and ditrimethylolpropane tetraacrylate. Then, a coin type secondary battery is obtained by using the gel polymer electrolyte.

Example 8

A gel polymer electrolyte is obtained in the same manner as described in Example 1, except that lithium bis(trifluoromethanesulfonyl)imide (LiTFSI) is used instead of lithium bis(fluorosulfonyl)imide (LiFSI). Then, a coin type secondary battery is obtained by using the gel polymer electrolyte.

Example 9

A gel polymer electrolyte is obtained in the same manner as described in Example 2, except that lithium bis(trifluoromethanesulfonyl)imide (LiTFSI) is used instead of lithium bis(fluorosulfonyl)imide (LiFSI). Then, a coin type secondary battery is obtained by using the gel polymer electrolyte.

Example 10

A polymer cell (capacity: 1350 mAh) is obtained by using the composition for a gel polymer electrolyte obtained according to Example 2 and the same electrodes as the production of a coin type battery.

Example 11

A polymer cell (capacity: 1350 mAh) is obtained by forming a polyethylene terephthalate protective film on the cathode tab of the polymer cell according to Example 10.

Comparative Example 1

A composition for a gel polymer electrolyte and a coin type secondary battery are obtained in the same manner as described in Example 1, except that the polymerizable monomers and polymerization initiator are not used.

Comparative Example 2

A composition for a gel polymer electrolyte and a coin type secondary battery are obtained in the same manner as described in Example 2, except that the polymerizable monomers and polymerization initiator are not used.

The above Examples and Comparative Examples are shown in brief in the following Table 1.

TABLE 1

| | Electrolyte salt | Electrolyte type | Corrosion inhibitor | Battery type |
|---|---|---|---|---|
| Ex. 1 | 1M LiFSI | gel | — | coin type secondary battery |
| Ex. 2 | 1.2M LiFSI | gel | — | coin type secondary battery |
| Ex. 3 | 0.5M LiFSI + 0.5M LiPF$_6$ | gel | — | coin type secondary battery |
| Ex. 4 | 0.5M LiFSI + 0.5M LiBF$_4$ | gel | — | coin type secondary battery |
| Ex. 5 | 1M LiFSI | gel | Tris(trimethylsilyl)phosphate | coin type secondary battery |
| Ex. 6 | 1M LiFSI | gel | sodium phosphate monobasic | coin type secondary battery |
| Ex. 7 | 1M LiFSI | gel | — | coin type secondary battery |
| Ex. 8 | 1M LiTFSI | gel | — | coin type secondary battery |
| Ex. 9 | 1.2M LiTFSI | gel | — | coin type secondary battery |
| Ex. 10 | 1M LiFSI | gel | — | polymer cell (cathode tab protective film is not attached) |
| Ex. 11 | 1M LiFSI | gel | — | polymer cell (cathode tab protective film is attached) |
| Comp. Ex. 1 | 1M LiFSI | liquid | — | coin type secondary battery |
| Comp. Ex. 2 | 1.2M LiFSI | liquid | — | coin type secondary battery |

Test Example 1

Each of the lithium secondary batteries (capacity: 3.0 mAh) according to Examples 1-9 and Comparative Examples 1 and 2 is charged to 4.2V under a constant current condition of 0.1 C, and then under a constant voltage condition of 4.2V. The charging is stopped when the charged current reaches 1/20 C. Then, each battery is allowed to stand for 10 minutes and discharged to 2.7V under a constant current condition of 0.1 C. Then, each battery is charged to 4.2V under a constant current condition of 0.7 C, and then charged under a constant voltage condition of 4.2V. After that, the charging is stopped when the charged current reaches 1/20 C. Then, each battery is allowed to stand for 10 minutes and discharged to 2.7V under a constant current condition of 0.5 C.

The above charge/discharge cycles are carried out 10 times.

Test Example 2

After carrying out Test Example 1, each of the lithium secondary batteries (capacity: 3.0 mAh) according to Examples 1-9 and Comparative Examples 1 and 2 is charged to 4.35V under a constant current condition of 0.1 C, and then charged under a constant voltage condition of 4.35V.

The charging is stopped when the charged current reaches 1/20 C. Then, each battery is allowed to stand for 10 minutes and discharged to 2.7V under a constant current condition of 0.1 C. Then, each battery is charged to 4.35V under a constant current condition of 0.7 C, and then charged under a constant voltage condition of 4.35V. After that, the charging is stopped when the charged current reaches 1/20 C. Then, each battery is allowed to stand for 10 minutes and discharged to 2.7V under a constant current condition of 0.5 C. The above charge/discharge cycles are repeated.

The results of Test Examples 1 and 2 are shown in FIG. 4 and FIG. 5.

As shown in FIG. 4, the battery according to Example 1 shows normal voltage behaviors during charge/discharge cycles with the lapse of time, while the battery according to Comparative Example 1 shows unstable behaviors due to corrosion.

In addition, as shown in FIG. 5, each of the batteries according to Examples 1-8 allows normal charge/discharge cycles at a charge cut-off voltage of 4.2V and even at a higher charge cut-off voltage of 4.35V, while each of the batteries according to Comparative Examples 1 and 2 does not allow charge/discharge cycles even at 4.2V.

Meanwhile, when using LiFSI as an imide salt, the corrosion inhibition and charge/discharge characteristics are better as compared to LiTFSI. When using LiFSI in combination with another lithium salt (Examples 3 and 4), the use of LiFSI in combination with a corrosion inhibitor provides the best corrosion inhibition and charge/discharge characteristics.

In addition, when using an acrylate monomer as a polymerizable monomer for electrolyte composition (Examples 1-6), the corrosion inhibition and charge/discharge characteristics are better as compared to a propylene oxide monomer (Example 7).

Test Example 3

Each of the polymer cells according to Examples 10 and 11 is charged to 4.2V under a constant current condition of 0.5 C, and then charged under a constant voltage condition of 4.2V. The charging is stopped when the charged current reaches 1/20 C. Then, each polymer cell is allowed to stand for 10 minutes and discharged to 2.7V under a constant current condition of 0.5 C. The above charge/discharge cycles are carried out 400 times.

The test results are shown in FIG. 6. As shown in FIG. 6, Example 11 shows little change in capacity up to 400 cycles, and Example 10 also shows little change in capacity up to 250 cycles.

Meanwhile, FIG. 7 shows the photo of the cathode tab, after subjecting Examples 10 and 11 to the test.

In the case of the polymer cell having no protective film on the cathode tab according to Example 10, it is observed that a portion of the tab causes short due to corrosion after repeating charge/discharge cycles (see Part A of FIG. 7), resulting in a drop of capacity at about 300 cycles (see FIG. 6). Meanwhile, in the case of the polymer cell having a protective film on the cathode tab according to Example 11, it is observed that the cathode tab causes no corrosion even after repeating charge/discharge cycles (see Part B of FIG. 7).

The invention claimed is:

1. A gel polymer electrolyte obtained by polymerizing a composition for a gel polymer electrolyte consisting of:
    a polymerizable monomer,
    a polymerization initiator,
    an electrolyte salt, wherein the electrolyte salt is an imide salt, wherein the imide salt consists of lithium bis(fluorosulfonyl)imide,
    a lithium salt other than the imide salt, wherein the lithium salt other than the imide salt is at least one selected from the group consisting of $LiPF_6$ and $LiBF_4$,
    an electrolyte solvent, and
    a corrosion inhibitor;
    wherein the corrosion inhibitor is one selected from the group consisting of tris(trimethylsilyl)phosphate, tris(triethylsilyl)phosphate, $NaH_2PO_4$ (sodium phosphate monobasic), $Na_2HPO_4$, $Na_3PO_4$, $NaHSO_3$, $Na_2SO_3$, methylene methanedisulfonate, ethylene sulfate, and ethylene sulfite,
    wherein the electrolyte solvent is a binary electrolyte solvent,
    wherein the molar ratio of the lithium salt other than the imide salt to the imide salt is 2:8 to 7:3,
    wherein the polymerizable monomer is an acrylate-based compound selected from the group consisting of 2-cyanoethyl acrylate, tetraethyleneglycol diacrylate, polyethyleneglycol diacrylate, 1,4-butanediol diacrylate, 1,6-hexanediol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, polyethyleneglycol diglycidyl ether, 1,5-hexadiene diepoxide, glycerol propoxylate triglycidyl ether, vinylcyclohexene dioxide, 1,2,7,8-diepoxyoctane, 4-vinylcyclohexene dioxide, butylglycidyl ether, diglycidyl 1,2-cyclohexanedicarboxylate, ethyleneglycol diglycidyl ether, glycerol triglycidyl ether and glycidyl methacrylate, or a mixture of two or more of them,
    wherein the electrolyte salt is used in a concentration of 0.5M-2.0M based on the composition for the gel polymer electrolyte.

2. A secondary battery comprising a cathode, an anode and the gel polymer electrolyte as defined in claim 1.

3. The secondary battery according to claim 2, wherein the cathode comprises: a cathode collector; a cathode tab protruding from the cathode collector; and a protective film formed on the cathode tab.

4. The secondary battery according to claim 3, wherein the protective film comprises any one or a mixture of two or more selected from the group consisting of a polyethylene terephthalate (PET) film, polyimide (PI) film and a polypropylene (PP) film.

5. The secondary battery according to claim 3, wherein the protective film has a thickness of 1 μm to 100 μm.

6. The secondary battery according to claim 3, wherein the cathode tab is a non-coated portion having no cathode active material-coated portion.

7. The secondary battery according to claim 3, wherein the protective film is present in a ratio of 10%-90% based on the total length of the cathode tab along the protruding direction of cathode tab.

8. The secondary battery according to claim 3, wherein the protective film has the same width as the width of the cathode tab perpendicular to the protruding direction of cathode tab.

9. The secondary battery according to claim 3, wherein the cathode further comprises an insulating layer.

10. The secondary battery according to claim 9, wherein the insulating layer is present between the cathode tab and the protective film or on the protective film.

11. The secondary battery according to claim 9, wherein the insulating layer comprises at least one selected from the group consisting of polyethylene terephthalate, polypropylene, polyester, polyphenylene sulfide, polyimide, acetate, glass fabric, polyvinylidene fluoride, polyvinylidene fluoride-co-hexafluoropropylene, epoxy resins and polyamide resins.

12. The secondary battery according to claim 2, which has a cylindrical shape, prismatic shape or pouch-like shape.

\* \* \* \* \*